United States Patent
Chang et al.

[11] Patent Number: 6,134,584
[45] Date of Patent: Oct. 17, 2000

[54] METHOD FOR ACCESSING AND RETRIEVING INFORMATION FROM A SOURCE MAINTAINED BY A NETWORK SERVER

[75] Inventors: Sih-Pin Chang, Old Tappan, N.J.; Ephraim Feig, Chappaqua, N.Y.; Thomas Yu-Kiu Kwok, Washington Township, N.J.

[73] Assignee: International Business Machines Corporation, Armonk, N.Y.

[21] Appl. No.: 08/975,865

[22] Filed: Nov. 21, 1997

[51] Int. Cl.[7] .......................... G06F 15/16; G06F 15/173
[52] U.S. Cl. .......................... 709/219; 709/225; 709/229
[58] Field of Search .................................. 709/219, 225, 709/229

[56] References Cited

U.S. PATENT DOCUMENTS

| | | | |
|---|---|---|---|
| 5,727,164 | 3/1998 | Kaye et al. | 705/28 |
| 5,754,655 | 5/1998 | Hughes et al. | 380/24 |
| 5,768,528 | 6/1998 | Stumm | 709/231 |
| 5,796,952 | 8/1998 | Davis et al. | 709/224 |
| 5,878,228 | 3/1999 | Miller et al. | 709/235 |
| 5,889,863 | 3/1999 | Weber | 380/25 |

OTHER PUBLICATIONS

Rosenfeld et al; "Automated Filtering of Internet Posting" Online, vol. 18, No. 3, pp. 27–30.
Jaeger et al. "Preserving Integrity In Remote File Location and Retrieval"; IEEE 1996, pp. 53–63.
Haskin, David "Traveling Software's Web Ex 20 Brings The Internet to you", Computer Shopper Sep. 1997, v. 16, No. 9, p. 527(1).
Hastings, Bryan "Web Ex: Download now Hyperbrowse Later", PC World, Oct. 1996, vol. 14, No. 10 p. 98 (1).
Chernicoff, David "Web Ex Sifts Through Online Information Glut", Window Sources Apr. 1997, vol. 5, No. 4, p. 92 (1).
Williams, Dennis "Web Ex Browse Internet Offline" Lan Times, Sep. 30, 1996, vol. 13, No. 22, p. 18(1).

*Primary Examiner*—Krisna Lim
*Attorney, Agent, or Firm*—Thomas A. Beck

[57] ABSTRACT

A method and system is disclosed for scheduling data download, such as web pages, databases or softwares, over a network such as the internet. The method includes the steps of (a) initiating the data download request and the user input interfaces; saving the requesting computer system's network address; (b) fetching and saving those web pages, databases or softwares' source entities and their corresponding network addresses for the upcoming data download; (c) fetching and saving from the user's input on the schedules, user ids and passwords, disk directories, limits on bandwidth, downloading time and allocated storage space for the data download; (d) setting the system timer at the wake-up time according to the data download schedules; (e) automatically turning on the requesting computer system according to the system timer and dialing up to connect to the network; (f) accessing the download data's network address and transmitting the data to the requesting computer system; (g) receiving and storing the requested web pages, databases or softwares in the requesting computer system; (h) interrupting a particular data downloading if the downloading time exceeding the user's earlier input downloading time limit or if the allocated download storage space reached the user specified limit; (i) automatically disconnecting from the network; (j) automatically rescheduling the data download in some other time if the previous data download is not successful or the network is too busy; (k) automatically turning off the requesting computer system. In this manner the requester doesn't need to keep the requesting computer system power on till the upcoming download actvities.

22 Claims, 3 Drawing Sheets

METHOD FOR ACCESSING AND RETRIEVING INFORMATION FROM A SOURCE MAINTAINED BY A NETWORK SERVER

FIELD OF THE INVENTION

This invention relates to data communications networks and, in particular, to methods and apparatus for accessing and retrieving information from a database, documents, files or web pages maintained by a network server. The methods and apparatus of this invention are particularly useful for scheduling the data download from the World Wide Web (WWW) without keeping the requesting computer system power on all the time till the upcoming download activites. The methods and apparatus of this invention also allow the user to download data from web sites requiring user id and password by supplying the previous stored user id and password on the requesting computer system.

BACKGROUND OF THE INVENTION

An internet user typically employs a browser to access the WWW. The most popular browsers are Netscape's Navigator and Microsoft's Internet Explorer. Often a user wishes to download data from various sites. The user may be linked to these sites during certain periods of the day in which either the internet of the server at the linked sites may be very busy. Downloading at such times could take a very long time. The user may not wish to tie up his browser, or the computer in which the browser is housed, for such a long time. In addition, the connections may require connect charges billed on a per minute basis.

The widespread availability of WWW phones, Personal Data Assistants (PDAs), and Windows-based CE machines with internet connectivity are expected to soon provide internet access capability to larger portions of the earth's population, thereby making efficient techniques to access WWW pages (web pages) even more desirable.

For many users an internet connection made at home some time in the middle of the night may be lower in cost than a connection made during peak phone-rate hours while travelling.

At present there exist several techniques that are known to the inventor for indicating specific web pages to be downloaded at a later time. These techniques download the requested pages to the same (requesting) machine at a later time, for example at night when phone rates are lower and internet traffic is reduced.

There also exist so-called push technology schemes, such as one known as Pointcast™, that periodically download information from certain sites to a given data processor. A user can schedule, for example, news, stock, and/or weather information to be downloaded at specific times or at specific intervals. However, these techniques also download the requested information to the requesting data processor.

Other techniques, such as one known as Webwhacker™, enable a user to make a local copy of a web site, and allow the user to specify a number of links (i.e., Hyperlinks) to follow and download.

A technology available from the assignee of this patent application, referred to as ARTour WebExpress™, allows a user to browse the web more asynchronously than is possible with current browsers. For example, using conventional WWW browsers such as Netscape Navigator™ 3.0 or Internet Explorer™ 3.0 the user can scroll a current page while a next page is being downloaded, thereby providing a degree of asynchronous access. The WebExpress™ technique takes this one level further by allowing the user to continue to specify links (Hyperlinks) to fetch while previously specified pages are being fetched. These requests are queued by in a local buffer and the pages are fetched in a sequential manner. When the requested pages are available on the local machine, the user is made aware of it by a suitable signaling mechanism.

A proxy server is a World Wide Web server that acts as the sole web server for an entire domain, or for those client computers that are placed behind a firewall (i.e., a logical block between the clients and the rest of the internet). The proxy server typically resides at the firewall and intercepts all web requests originating from clients within the firewall. If a given web page request is not in the proxy server's access control list, the request is processed normally and the retrieved web page is sent back to the requesting client. If, however, the requested web page or web site is on the control list, the client instead receives a message indicating that the URL is not accessible or is not valid.

A proxy server can improve a network's performance by functioning as a caching server. Using its cached web pages, the proxy server will serve already-accessed web pages to requesting clients without requiring outside access to the internet. For example, consider a case of an environment where n client computers access the same web page, wherein each client computer outputs the address (URL) of the web page to be accessed. Without the use of the proxy server, n separate requests for the web page are initiated, and n separate copies of that same web page are retrieved and returned to the client computers.

Using a proxy server, however, the same n web page requests are handled more efficiently. Only the first request to reach the proxy server actually causes that web page to be retrieved from the WWW server, and only if that web page is not already stored in the proxy server's cache. When retrieved, the web page is sent back to the requesting client computer, and is also cached on the proxy server's hard disk. The remaining n−1 clients that request that same web page are then served instead from the proxy server's cache, thus avoiding unnecessary duplicated requests and delays.

An article by L. B. Rosenfeld and M. P. Holland (Online, Vol. 18, no. 3, pp 27–30, May 1994) discusses an internet filtering system which automatically downloads postings daily.

An article by T. Jaeger and A. D. Rubin (Proc. of Symp. on Network and Distributed System Security, IEEE Computer Soc. Press, pp 53–63, 1996) discusses an automated file location and retrieval system which retrieves files and software across the internet.

A web page from Traveling Software (http://www.travsoft.com/press_room/webex.htm) discloses a software downloading package known as WebEx which allows a user to select which web sites to download as well as when to begin the downloading operation. For this method to work, the receiving client must be powered on. Also the downloading will occur no matter what bandwidth is established between the server and the receiving client. This may not be desirable, as in the case where costs are proportional to the time spent for the link to be operational, and when the link is of very low bandwidth, thereby making the download expensive.

However, none of the existing techniques that are known to the inventors enable web pages and other data to be downloaded to this or anoter machine at some other specified time, whether on not that machine is powered on or not.

Nor do any of the existing techniques that are known to the inventors enable data to be downloaded only if a minimum prescribed bandwidth between the server and the receiving client is obtained.

OBJECTS AND ADVANTAGES OF THE INVENTION (TK)

It is an object and advantage of this invention to provide an improved method and apparatus for downloading information from a server that overcomes the foregoing and other problems.

It is an object and advantage of this invention to provide a method and system for scheduling the data download from the World Wide Web (WWW) without keeping the requesting computer system power on all the time till the upcoming download activites. The methods and apparatus of this invention also allow the user to download data from web sites requiring user id and password by supplying the previous stored user id and password on the requesting computer system.

SUMMARY OF THE INVENTION

The foregoing and other problems are overcome and the objects of the invention are realized by methods and apparatus in accordance with embodiments of this invention.

A method and system is disclosed for scheduling data download, such as web pages, databases or softwares, over a network such as the internet without keeping the computer system power on all the time till the upcoming data download activities. The method includes the steps of (a) initiating the data download request and the user input interfaces; saving the requesting computer system's network address, the requesting computer system being either connected to or disconnected from the network; (b) fetching from the internet (the network connected requesting computer system) or from the user's input (the network disconnected requesting computer system) and saving those web pages, databases or softwares' source entities and their corresponding network addresses (e.g. the web site URL on the distant server) for the upcoming data download (which web pages and their linked sub level pages are to be downloaded); (c) fetching and saving from the user's input on the data download schedules (when the data download is to take place) and user id and password if required for those web pages, databases or softwares for the upcoming download; and other user's options and choices, such as where the downloaded data is to be stored (i.e. cache or disk directory), limits on downloading time and allocated storage space, and automatically rescheduling another data download for previous unsuccessful data download; data downloading either scheduled all at the same time in sequent or individually at different time; (d) setting the system timer at the wake-up time according to the data download schedules; (e) automatically turning on the requesting computer system according to the system timer if the requesting computer system is not turned on, and dialing up to connect to the network; generating a network busy signal to the Internal Data Download Schedule for rescheduling the data download according to the user's input of options and choices if the network is busy; (f) accessing the download data's network address and transmitting the data to the requesting computer system; providing the user id and password if required; (g) receiving and storing the requested web pages, databases or softwares in the requesting computer system for subsequent use by the user; transmitting successful and unsuccessful download messages from the destination entity to the requesting computer system; accordingly generating successful or unsuccessful data download messages for the user and unsuccessful data download signals to the Internet Data Download Scheduler to schedule another try of data download according to the user's input of options and choices; the user can access all these messages when the user logs on the requesting computer system; (h) interrupting a particular data downloading (transmitting and receiving) if the downloading time (estimated or actual) exceeding the user's earlier input downloading time limit or if the allocated download storage space reached the user specified limit; (i) automatically disconnecting from the network; (j) automatically rescheduling the data download in some other time, such as every hour afterwards, according to the user's earlier input choice if the previous data download is not successful or the network is too busy; (k) automatically turning off the requesting computer system. In this manner the requester doesn't need to keep the requesting computer system power on for the upcoming download actvities.

The most important advantage of this invention is that the requesting computer system does not have to be power on all the time till the upcoming download activities.

Other advantages of this invention include the abilities of allowing the user to schedule data download from those web sites requiring an user id and password, and to specifying the upper limits on the download time and the allocated storage space for downloaded data.

In one embodiment the step of initiating includes steps of generating a web page download command and transmitting the web page download command to the destination entity. This may be accomplished over the network, or over another network, such as an intranet, that connects the initiating and destination entities. In this case the step of fulfilling includes initial steps of formulating, in response to receiving the web page download command at the destination entity, a network web page request message and transmitting the network web page request message from the destination entity to the web page source entity. A confirmation message may be sent to the initiating entity to confirm the receipt of the web page download command.

In another embodiment of this invention the step of initiating includes steps of generating the network web page request message that includes the user id and password if required and transmitting the network web page request message from the initiating entity to the web page source entity. In this case the web page source entity checks the user id and password if required before transmits the requested web page(s) to the destination entity at the requesting computer system network address.

The step of initiating includes a preliminary step of responding to a signal from a user through a user interface, such as by redefining mouse clicks when interacting with a web browser, such that the signal indicates that a specified web page is to be downloaded to and stored in the destination entity, as opposed to being fetched and displayed in a conventional manner. In this embodiment the step of responding includes a step of prompting the user to enter information for specifying at least one parameter related to downloading the web page, and/or includes a step of retrieving at least one user default parameter related to downloading the web page.

In a preferred embodiment the web page download command sent by the initiating entity includes a plurality of fields, including fields intended to specify: at least one user download preference; and at least one postprocessing operation to be performed on a received web page. The at least one user download preference includes at least one of: a number of web page levels to download; whether to download graphical data; a number of permissible retries to download a web page; and an interval between the retries. The at least one postprocessing operation includes at least one of: whether to decompress a received web page; whether to virus scan a received web page; and whether to print a received web page.

The step of receiving and storing the requested web page in the destination entity includes a step of writing data into an index entry associated with the received web page. The index entry is comprised of a plurality of fields, including fields intended to specify: the first and second network addresses, and a link summary of the web page. The index entry fields further specify at least one of: a time that the web page was downloaded; a number of bytes that were downloaded; a time that the web page download command was received by the destination entity; a number of retries that were required, if any, to download the web page; and an error report.

In a preferred embodiment of this invention the method includes a capability to transmit a cancellation message from the initiating machine to the destination machine. In response to receiving a cancellation message the destination machine one of terminates an on-going web page download, or deletes an already downloaded and stored web page, as well as the index information associated with the stored web page.

In a preferred, but not limiting embodiment, the network includes the internet, and the web page source entity is a WWW server compliant with conventional and/or extended HTTP protocols.

BRIEF DESCRIPTION OF THE DRAWINGS

The above set forth and other features of the invention are made more apparent in the ensuing Detailed Description of the Invention when read in conjunction with the attached Drawings, wherein:

FIG. 2 is a logic flow diagram showing a method executed by the IDP of FIG. 1; and

DETAILED DESCRIPTION OF THE INVENTION

The following description of this invention is made in the context of methods and apparatus that use a browser software entity for specifying and downloading web pages from an internet-connected server. It should be realized, however, that the teachings of this invention apply as well to accessing and retrieving other data, such as database information, documents, and files, that is available through a network-connected server.

Figure 1:
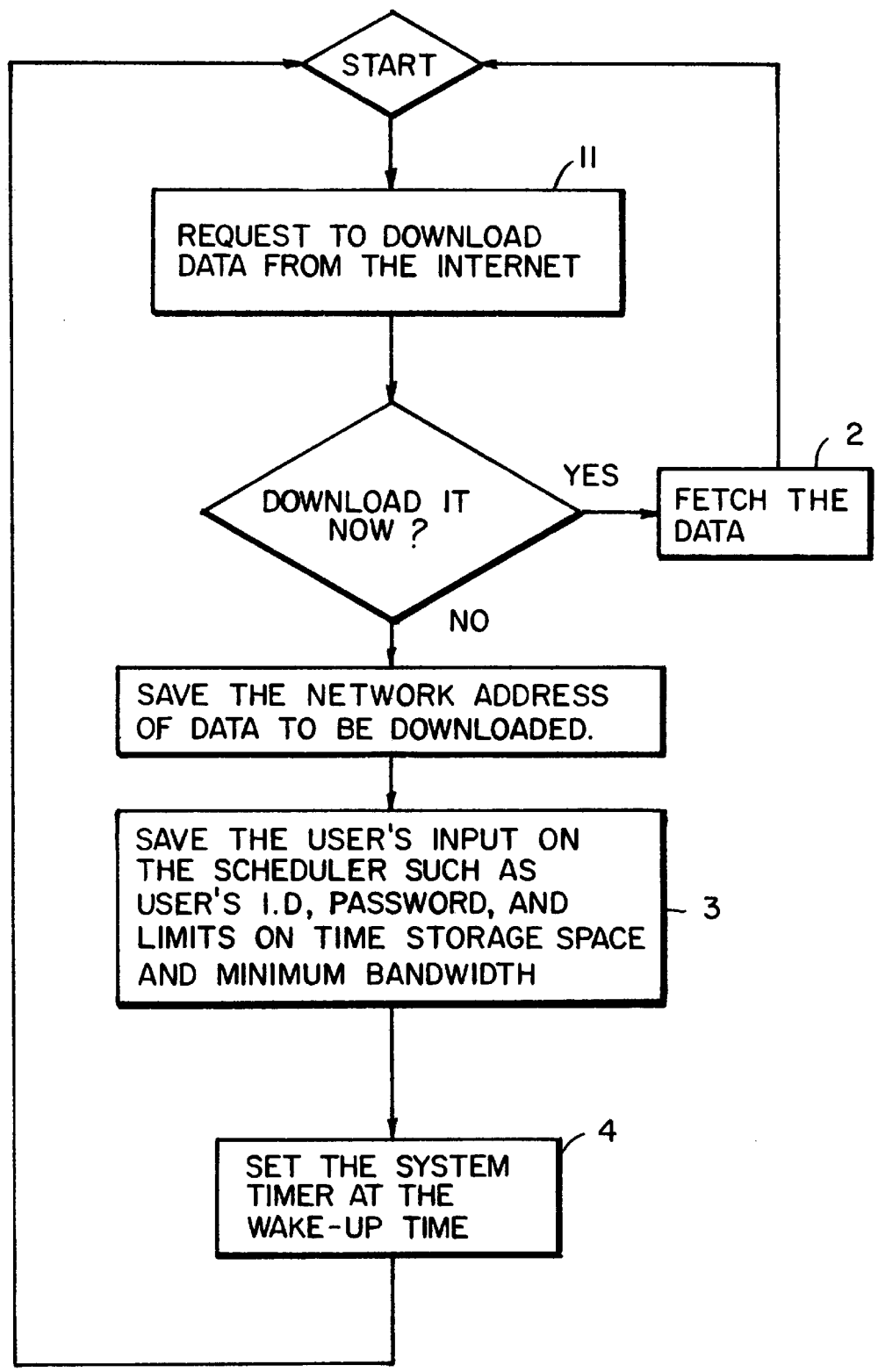
FIG. 1 is a logic flow diagram showing how to set up the Internet Data Download Scheduler.
Figure 2A:
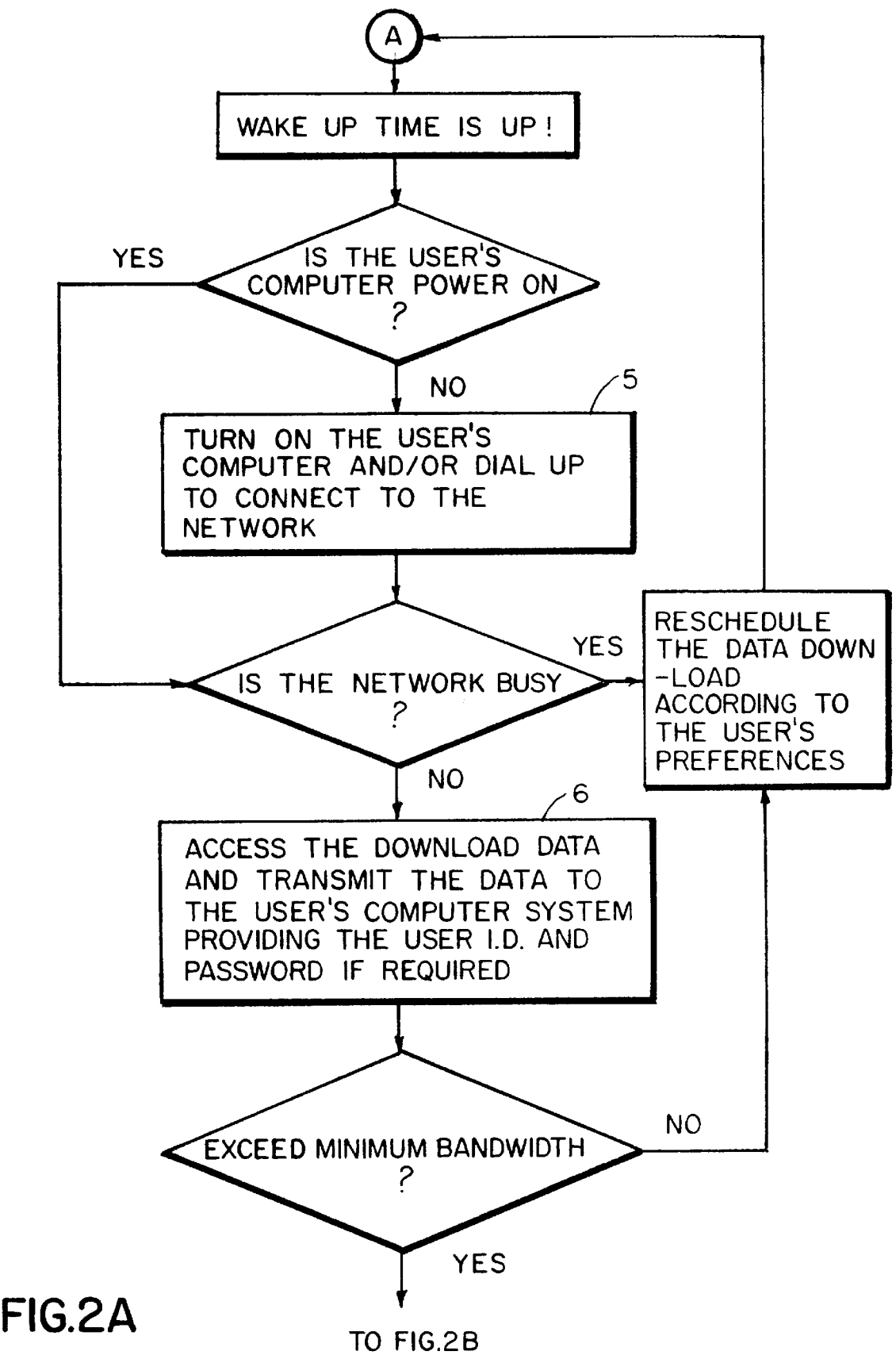
FIG. 2 is a logic flow diagram showing a method executed by the Internet Data Download Scgeduler when the system timer is up at the scheduled wake-up time.
Figure 2B:
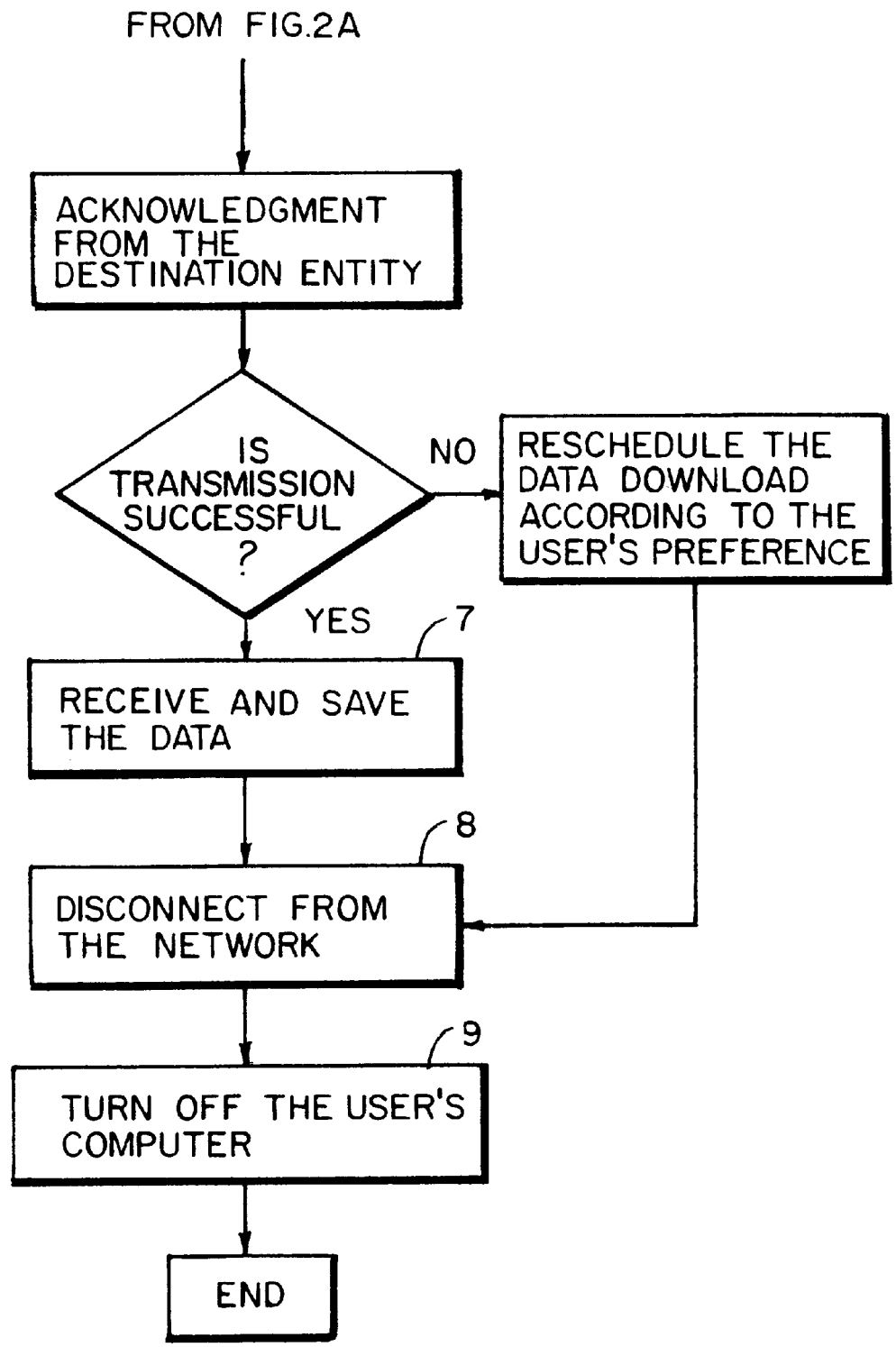

A method and system is disclosed for scheduling data download, such as web pages, databases or softwares, over a network such as the internet without keeping the computer system power on all the time till the upcoming data download activities. In FIG. 1 it shows when and how to set up the Internet Data Download Scheduler. It describes the following method from steps (a) to (d). In FIG. 2 it shows a method to be executed by the Internet Data Download Scheduler when the system timer is up at the scheduled wake-up time. It descriv=bes the following method from steps (e) to (k).

The method includes the steps of (a) initiating the data download request and the user input interfaces; saving the requesting computer system's network address, the requesting computer system being either connected to or disconnected from the network; (b) fetching from the internet (the network connected requesting computer system) or from the user's input (the network disconnected requesting computer system) and saving those web pages, databases or softwares' source entities and their corresponding network addresses (e.g. the web site URL on the distant server) for the upcoming data download (which web pages and their linked sub level pages are to be downloaded); (c) fetching and saving from the user's input on the data download schedules (when the data download is to take place) and user id and password if required for those web pages, databases or softwares for the upcoming download; and other user's options and choices, such as where the downloaded data is to be stored (i.e. cache or disk directory), limits on downloading time and allocated storage space, what the minimum bandwidth is between the requesting computer system and the distant server, and automatically rescheduling another data download for previous unsuccessful data download; data downloading either scheduled all at the same time in sequent or individually at different time; (d) setting the system timer at the wake-up time according to the data download schedules; (e) automatically turning on the requesting computer system according to the system timer if the requesting computer system is not turned on, and dialing up to connect to the network; generating a network busy signal to the Internal Data Download Schedule for rescheduling the data download according to the user's input of options and choices if the network is busy; (f) accessing the download data's network address and transmitting the data to the requesting computer system; providing the user id and password if required; (g) receiving and storing the requested web pages, databases or softwares in the requesting computer system for subsequent use by the user; transmitting successful and unsuccessful download messages from the destination entity to the requesting computer system; accordingly generating successful or unsuccessful data download messages for the user and unsuccessful data download signals to the Internet Data Download Scheduler to schedule another try of data download according to the user's input of options and choices; the user can access all these messages when the user logs on the requesting computer system; (h) interrupting a particular data downloading (transmitting and receiving) if the downloading time (estimated or actual) exceeding the user's earlier input downloading time limit or if the allocated download storage space reached the user specified limit; (i) automatically disconnecting from the network; (j) automatically rescheduling the data download in some other time, such as every hour afterwards, according to the user's earlier input choice if the previous data download is not successful or the network is too busy; (k) automatically turning off the requesting computer system. In this manner the requester doesn't need to keep the requesting computer system power on for the upcoming download actvities.

The most important advantage of this invention is that the requesting computer system does not have to be power on all the time till the upcoming download activities. Other advantages of this invention include the abilities of allowing the user to schedule data download from those web sites requiring an user id and password, and to specifying the upper limits on the download time and the allocated storage space for downloaded data.

In one embodiment the step of initiating includes steps of generating a web page download command and transmitting the web page download command to the destination entity. This may be accomplished over the network, or over another network, such as an intranet, that connects the initiating and destination entities. In this case the step of fulfilling includes initial steps of formulating, in response to receiving the web page download command at the destination entity, a network web page request message and transmitting the network web page request message from the destination entity to the web page source entity. A confirmation message may be sent to the initiating entity to confirm the receipt of the web page download command.

In another embodiment of this invention the step of initiating includes steps of generating the network web page request message that includes the user id and password if required and transmitting the network web page request message from the initiating entity to the web page source entity. In this case the web page source entity checks the user id and password if required before transmits the requested web page(s) to the destination entity at the requesting computer system network address.

The step of initiating includes a preliminary step of responding to a signal from a user through a user interface, such as by redefining mouse clicks when interacting with a web browser, such that the signal indicates that a specified web page is to be downloaded to and stored in the destination entity, as opposed to being fetched and displayed in a conventional manner. In this embodiment the step of responding includes a step of prompting the user to enter information for specifying at least one parameter related to downloading the web page, and/or includes a step of retrieving at least one user default parameter related to downloading the web page.

In a preferred embodiment the web page download command sent by the initiating entity includes a plurality of fields, including fields intended to specify: at least one user download preference; and at least one postprocessing operation to be performed on a received web page. The at least one user download preference includes at least one of: a number of web page levels to download; whether to download graphical data; a number of permissible retries to download a web page; and an interval between the retries. The at least one postprocessing operation includes at least one of: whether to decompress a received web page; whether to virus scan a received web page; and whether to print a received web page.

The step of receiving and storing the requested web page in the destination entity includes a step of writing data into an index entry associated with the received web page. The index entry is comprised of a plurality of fields, including fields intended to specify: the first and second network addresses, and a link summary of the web page. The index entry fields further specify at least one of: a time that the web page was downloaded; a number of bytes that were downloaded; a time that the web page download command was received by the destination entity; a number of retries that were required, if any, to download the web page; and an error report.

In a preferred embodiment of this invention the method includes a capability to transmit a cancellation message from the initiating machine to the destination machine. In response to receiving a cancellation message the destination machine one of terminates an on-going web page download, or deletes an already downloaded and stored web page, as well as the index information associated with the stored web page.

In a preferred, but not limiting embodiment, the network includes the internet, and the web page source entity is a WWW server compliant with conventional and/or extended HTTP protocols.

What is claimed is:

1. A method for downloading data from a server via a network, comprising the following steps:

initiating a data download request with a requesting entity having a first network address, said data comprising a web page, a database and a software;

said initiating said download request including the steps of:

generating a web page download command;

having an interface to allow said requesting entity to connect to said network;

responding to a signal from a user through a user interface as a preliminary step, said signal indicating that a specified web page is to be downloaded to and stored in said requesting entity;

initiating a user input interface including the steps of:

specifying a data source;

specifying a data network address;

specifying limits on downloading time;

specifying a limit on allocated storage space for said download data request;

specifying the minimum bandwidth between said requesting entity and a data server entity;

optionally specifying a user id and password;

fulfilling said data download request with a data server entity having a second network address;

transmitting said requested data to said requesting entity having said first network address;

receiving and storing said requested data in said requesting entity for subsequent access by a user;

there being a schedule for said receiving and storing of said requested data in said requesting entity for subsequent access by a user which is selected from the group consisting of:

data downloading scheduled all at the same time in sequence;

data downloading scheduled individually at different times;

the step of initiating a user input interface also including the steps of:

specifying cache or disk directory where the downloaded data is to be stored;

automatically rescheduling another data download for previous unsuccessful data download; and the fulfilling said data download request includes transmitting the network web page request message from said initiating entity to the web page server entity; and ending the down load request.

2. A method as in claim 1, wherein the data is comprised of:

a web page;

a database; and a software.

3. A method as in claim 1, wherein the step of initiating a data download request includes steps of:

generating a web page download command; the requesting entity having an interface for connecting to the network;

a preliminary step of responding to a signal from a user through a user interface, the signal indicating that a specified web page is to be downloaded to and stored in the requesting entity.

4. A method as in claim 1, wherein the step of intiating a user input interface includes steps of:
- specifying a data source;
- specifying a data network address; and
- specifying a user id and password if required;
- specifying limits on downloading time;
- specifying a limit on allocated storage space for said download data request;
- specifying the minimum bandwidth between the requesting entity and the data server entity and
- specifying the data download schedule.

5. A method as in claim 4, wherein the data download schedule is selected from the group consisting of:
- data downloading scheduled all at the same time in sequent; and
- data downloading scheduled individually at different times.

6. A method as in claim 4, further including specifying the other user's options and choices selected from the group consisting of one or more of:
- specifying cache or disk directory where the downloaded data is to be stored; and
- automatically rescheduling another data download for previous unsuccessful data download;
- supplying the user id and password if required; and
- where the step of fulfilling includes initial steps of,
- transmitting the network web page request message from the initiating entity to the web page server entity.

7. A method as in claim 1, wherein the data download command is transmitted over the network or a second network separate from the network.

8. A method as in claim 1, wherein the step of responding includes a step of prompting the user to enter information for specifying at least one parameter related to downloading the data.

9. A method as in claim 1, wherein the step of responding includes a step of retrieving at least one user default parameter related to downloading the data.

10. A method as in claim 1, wherein the data download command is comprised of a plurality of fields, including fields for specifying:
- at least one user download preference.

11. A method as in claim 10, wherein the at least one user download preference includes at least one of:
- nummber of web page levels to download;
- whether to download graphical data;
- a number of retries to download a web page; and
- an interval between retries.

12. A method as in claim 10, wherein the at least one postprocessing operation includes at least one of:
- whether to decompress a received web page;
- whether to virus scan a received web page; and
- whether to print a received web page.

13. A method as in claim 1, wherein the step of fulfilling the data download request, comprising the steps of:
- setting the system timer at the wake-up time according to the data download schedules;
- automatically turning on the requesting computer system according to the system timer if the requesting computer system is not turned on; and
- dialing up to connect to the network;
- generating a network busy signal to the Internet Data Download Schedule for rescheduling the data download according to the user's input of options and choices if the network is busy.

14. A method as in claim 1, wherein the step of transmitting the requested data to the requesting entity, comprising the steps of:
- providing the user id and password if required;
- transmitting successful and unsuccessful download messages from the destination entity to the requesting computer system;
- accordingly generating successful or unsuccesful data download messages for the user and unsuccessful data download signals to the Internet Data Download Scheduler to schedule another try of data download according to the user's input of options and choices;
- interrupting a particular data download if the downloading time exceeds the user's earler input downloading time limit or if the allocated download storage space reached the user specified limit;
- interrupting a particular data download if the banwidth between the requesting computer system and the distant server drops below the user specified minimum bandwidth.

15. A method as in claim 1, wherein the step of receiving and storing the requested web page in the destination entity includes a step of writing data into an index entry associated with the received web page.

16. A method as in claim 15, wherein the index entry is comprised of a plurality of fields, including fields for specifying:
- the first and second network addresses; and
- a link summary of the web page.

17. A method as in claim 16, wherein the fields further specify at least one of:
- a time that the web page was downloaded;
- a number of bytes that were downloaded;
- a time that the web page download command was received by the destination entity;
- a number of retries that were required, if any, to download the web page; and
- an error report.

18. A method as in claim 1, and further comprising steps of:
- transmitting a cancellation message from the initiating entity to the destination entity;
- receiving the cancellation message; and
- in response, one of terminating an on-going data page download or deleting an already downloaded and stored data.

19. A method as in claim 1, wherein the ending of the data download, comprising the steps of:
- automatically disconnecting from the network;
- automatically rescheduling the data download in some other time, such as every hour afterwards, accoding to the user's earlier input choice if the previous data download is not successful or the network is too busy; and
- automatically turning off the requesting computer system.

20. A method as in claim 1, wherein the network includes the internet, and wherein the server entity is comprised of a WWW server.

21. A method as in claim 14, wherein the particular data download is selected from the group consisting of transmitting and receiving.

22. A method as in claim 18, wherein a user can access all these messages when the user logs on the requesting computer system.

* * * * *